CROSS REFERENCE SEARCH ROO

May 1, 1962 H. HURVITZ 3,032,712

INTERMODULATION DISTORTION SYSTEM

Filed Oct. 28, 1959

INVENTOR.
HYMAN HURVITZ
Hurvitz & Rose
attorneys

United States Patent Office 3,032,712

Patented May 1, 1962

3,032,712

INTERMODULATION DISTORTION SYSTEM

Hyman Hurvitz, Washington, D. C., assignor to Panoramic Electronics, Inc., Mount Vernon, N.Y., a corporation of New York Filed Oct. 28, 1959, Ser. No. 849,197
12 Claims. (Cl. 324—57)

The present invention relates generally to systems for measuring intermodulation distortion, and more particularly to systems for testing relatively wide band translation devices, such as loudspeakers, audio amplifiers, and the like, to determine and measure the presence and magnitude of intermodulation distortion in the output thereof, and for measuring intermodulation distortion over a wide range of input frequency combinations to a translating device, and for plotting the intermodulation distortion generated by an amplifier continuously over a frequency band, as a function of frequency.

The present application is a continuation-in-part of my application, Serial No. 677,101, entitled Intermodulation Distortion Meter, filed August 8, 1957, now U.S. Patent # 2,929,989 issued March 22, 1960. In accordance with the invention described in that application for U.S. patent, two frequencies are applied to the input of a translating device, which is subject to test. One of these frequencies, $f_1$, may be fixed and may be for example 60 c.p.s. The other frequency, $f_2$, may be variable over a wide range. The output of the amplifier is applied to one input circuit of a balanced modulator and the variable frequency $f_2$ is applied to the other input circuit of the balanced modulator. Assuming that the balanced modulator is completely balanced, either input frequency alone applied thereto will result in no output therefrom. The term "balanced modulator" is used broadly, and includes any modulator from the output of which a signal input frequency may be balanced, and this may be accomplished in any one of the several forms of balanced modulators which inherently balance out input signals, and provide at their outputs only difference and sum frequencies, or in a heterodyne device provided with out phasing circuits for accomplishing the same objective.

Assuming that the balanced modulator is completely balanced, either input frequency alone will result in no output therefrom. To the output of the modulator is connected a tuned circuit, which may have a fixed frequency, in the specific example, 60 c.p.s. If now the output of the translation device subject to test contains no intermodulation components there will be applied to the input of the balanced modulator the first input frequency $f_1$ which will produce no output component of itself. The second input frequency $f_2$ which will produce no output component of itself, and the sum and the difference of the two input frequencies, neither of which will be capable of passage by the tuned amplifier, since neither one is 60 c.p.s. If, however, an intermodulation component $f_1 \pm f_2$ does appear at the output of the translation device, and is applied to the first input circuit of the balanced modulator, this intermodulation component will combine with the frequency $f_2$ to produce $f_1$, i.e., 60 c.p.s. This will be true regardless of the frequency $f_2$ of the second oscillator. Accordingly, the second oscillator can be tuned to any desired frequency and intermodulation distortion for that frequency readily determined. The output of the filter may be detected and applied to a meter, or may be indicated in any other convenient fashion.

In accordance with a modification of the invention, the variable frequency oscillator of the first specified embodiment may be automatically tuned over a range by means of a reactance tuner and sawtooth generator, or some equivalent device. The output of the latter may be applied to the horizontal deflection electrodes of a cathode ray tube indicator, and the vertical deflection electrode may be connected to the output of the filter, which then acts in place of the meter otherwise employed. In this manner, a continuous plot may be generated of intermodulation distortion as a function of one of the frequencies being applied to the translating device under test.

The present invention utilizes the principles above outlined, but in a novel fashion. It is well known that spectrum analyzers are available commercially, which are capable of analyzing the frequency components of a wide band spectrum, and of plotting the amplitudes of these components against frequency as a base line on the face of a cathode ray tube, or on a strip recorder. It is further known that a spectrum analyzer of the frequency scanning type, and which essentially consists of a superheterodyne radio receiver having a scanning local oscillator and suitable indicating circuits for indicating the response to the receiver as a function of the frequency of the local oscillator, may be adapted for indicating the response of a circuit to a swept band. For this purpose the local oscillator frequency of the superheterodyne receiver is converted by mixing with a fixed frequency, to a scanned band of frequencies corresponding with the response band of the superheterodyne receiver. The scanned band is then applied to the circuit, the frequency response characteristics of which it is desired to plot, and the response of the latter is applied to the input of the spectrum analyzer. Such systems being known and being commercially available, it is an object of the present invention to modify such systems with minimum additional components, so that they will be capable of providing a plot of intermodulation distortion generated by a translation device under test as well as generating a frequency response curve of the latter.

It is, accordingly, a broad object of the present invention to provide a modification circuitry for a spectrum analyzer, to adapt the latter to generate a plot of intermodulation response as a function of frequency.

It is another object of the present invention to provide a system for modifying a conventional superheterodyne scanning spectrum analyzer to provide a plot of the frequency response of a circuitry under test over a frequency band, and at will for converting the plot of frequency response to the plot of intermodulation response of the translating device under test, all without destroying the usefulness of the spectrum analyzer as a spectrum analyzer.

The above and still further objects, features and advantages of the present invention will become apparent upon consideration of the following detailed description of one specific embodiment thereof, especially when taken in conjunction with the accompanying drawing wherein.

Figure 1:
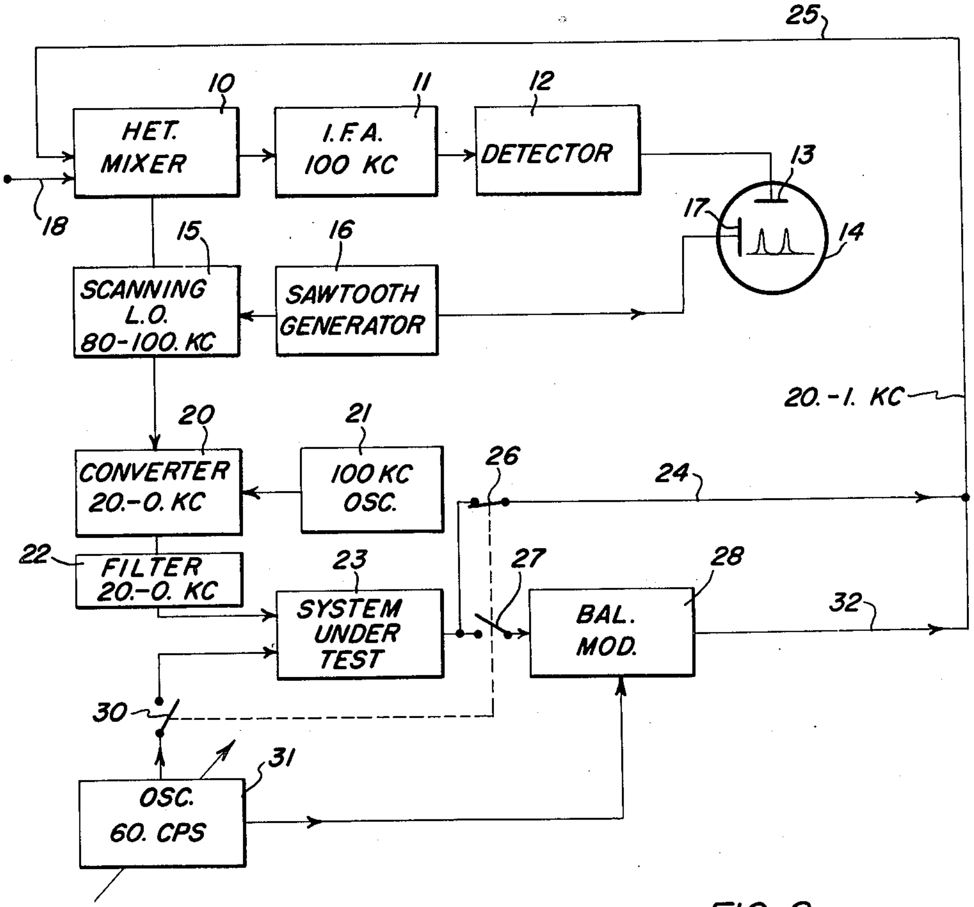
FIGURE 1 is a block diagram of a system according to the present invention.

Referring now more specifically to the accompanying drawing, the reference numeral 10 denotes a heterodyne mixer which is connected in cascade with an intermediate frequency amplifier 11, the latter being in turn connected in cascade with a detector 12, and the latter having its output applied to the vertical deflection electrode 13 of the cathode ray tube indicator 14. To the heterodyne mixer 10 is applied the output of a scanning local oscillator 15, which is caused to scan in response to a sawtooth generator 16. The output of the sawtooth generator 16 is applied to the horizontal deflection electrodes 17 of the cathode ray tube indicator 14 and to the scanning local oscillator 15 in desired relative amplitudes, the scanning local oscillator 15 being assumed to include the requisite reactance tube device or other device for effecting frequency modulation of a local oscillator. If then, a spectrum of frequencies is applied to an input lead 18, as the scanning local oscillator 15 scans over a range of frequencies and assuming that frequencies have been properly selected for the local oscillator, the input spectrum applied to lead 18 and I.F. frequency of the I.F. amplifier 11, as the scanning local oscillator 15 scans through its range, successive ones of the frequencies present in the spectrum applied to the input lead 18 will be selected by the I.F. amplifier 11, the response of the latter will be detected by the detector 12 and will serve to generate vertical deflections of the beam of the cathode ray tube indicator 14. Simultaneously with scanning of the local oscillator 15, the beam of the cathode ray tube indicator 14 will be horizontally deflected, so that a frequency plot will be generated.

To provide numerical examples of suitable frequencies, if the scanning local oscillator scans from 80 to 100 k.c. and if the I.F. amplifier 11 has a narrow band response centered on 100 kc., the input frequency may be the audio band 0 to 20 kc. and the spectrum analyzer is then an audio spectrum analyzer. However, I do not desire to be limited to any specific frequency ranges or frequency values.

The output of the scanning local oscillator 15 is applied to a converter 20, to which is also applied the output of the 100 kc. oscillator 21. There is then developed at the output of the converter tube a frequency scanning signal which scans over the range 20 to 0 k.c., as the scanning local oscillator 15 scans over the range 80 to 100 kc. This signal, which is selected by a filter 22, may be applied to a translating device or other system under test 23, and the output of the latter may be applied via a lead 24, and a further lead 25, to the input of the heterodyne mixer 10. In such case, the spectrum supplied over the lead 18 is disconnected. It then follows that as the signal applied to the system under test varies over the band 20 to 0 kc., the response of that system will appear as a signal on the lead 24, and being applied to the heterodyne mixer 10 will generate a visual display at the cathode ray tube indicator 14 will then represent the response of the system under test, 23, to the band of frequencies 20 to 0 kc., and the response of the spectrum analyzer comprising the elements 10–17 will track frequency-wise with the frequency applied to the system under test 23, automatically and inherently. The inclusion, then, of the frequency converter the oscillator 21 and the filter 22 greatly enhances the value of the spectrum analyzer in the laboratory, by permitting the latter to be utilized not only for measuring the frequency content of the spectrum, but also by permitting the latter to be utilized for testing the frequency response of a frequency sensitive circuit, such as a filter, or the like.

In accordance with the present invention the output of the system under test, 23, instead of being applied to the lead 24 via a switch 26 is applied via a further switch 27 to the input of a balanced modulator 28. There is also applied to the system under test 23, via a switch 30, the output of a low frequency oscillator 31. The output of the oscillator 31 is also applied to the input of the balanced modulator 28 and the output of the latter applied via a lead 32 and the lead 25 to the input of the heterodyne mixer 10.

The switches 26, 27 and 30 may be ganged, so that either the switch 25 is closed and the switches 27 and 30 open, or the opposite set of conditions exists. We may assume for the sake of example that the oscillator 31 generates 60 c.p.s. It then follows that if the system under test generates intermodulation components, these will be equal to the sum and difference of the output of the filter 22 and of the oscillator 31. The sum and difference frequencies are then beat in the balanced modulator 28 with the output of the oscillator 31, so that on the lead 32 will appear a frequency corresponding at each instant of time with the output of the filter 22. Such output will appear only if there is intermodulation component, since the output is generated by conversion of such intermodulation component with the output of the oscillator 31. It will be apparent that the output of the oscillator 31 may be adjusted to have any one of a wide range or values, since its frequency disappears at the output lead 32, and the only frequency on lead 32 is at all times precisely that for which the spectrum analyzer local oscillator 15 is correct, so that the response will pass through the I.F. amplifier, and the detector 12, and will appear as a display on the face of the cathode ray tube indicator 14.

In accordance with the present invention, then, by the inclusion of a local oscillator 31 and a balanced modulator 28 the spectrum analyzer system which is currently commercially available has its utility extended to enable it to provide intermodulation tests as well as frequency response tests for a translating device of any type, and does this without destroying the utility of the spectrum analyzer as such, or as a device for plotting frequency response curves of frequency sensitive circuits.

Figure 2:
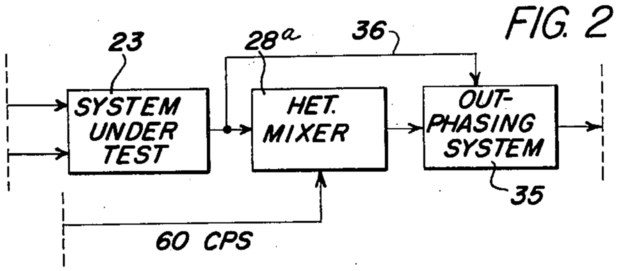
FIGURE 2 is a block diagram of a portion of the system of FIGURE 1 indicating a possible modification thereof.

A practical difficulty with the system of FIGURE 1 is that the balanced modulator 28 may be difficult to balance, because intermodulation components are of very slight amplitudes in relation to the signals which give rise to the intermodulation components. For example, in a very high grade amplifier, intermodulation components may be of the order of .1%. It follows that a very accurately balanced modulator must be provided. In accordance with the system of FIGURE 2, of the drawing, provision is made for utilizing a heterodyne mixer **28*a***, which may be a balanced modulator as in FIGURE 1, or which may conceivably be unbalanced This heterodyne mixer *28a* supplies its signal to an out-phasing system 35, to which is also applied output deriving directly from the system under test, via lead 36, the amount, frequency and phase of the output being such as to completely balance out the undesired component of frequency equal to that applied by the filter 22, leaving the I.M. distortion component at that frequency.

While I have described and illustrated one specific embodiment of my invention, it will be clear that variations of the details of construction which are specifically illustrated and described may be resorted to without departing from the true spirit and scope of the invention as defined in the appended claims.

What I claim is:

1. A system for measuring intermodulation distortion generated by a translating device, said translating device having an input circuit and an output circuit, comprising a source of fixed signal of frequency $f_1$ coupled to said input circuit, a source of frequency scanning signal of frequency $f_2$ coupled to said input circuit, a balanced mixer having plural input circuits and an output circuit, means coupling the output circuit of said translating device to one of said input circuits of said balanced mixer, means coupling said source of fixed frequency to another of said input circuits of said balanced mixer, a frequency scanning superheterodyne receiver having an input circuit coupled to the output circuit of said balanced mixer, and means for maintaining the reception frequency of said superheterodyne receiver equal to the frequency $f_2$.

2. A system according to claim 1 wherein said superheterodyne receiver includes a scanning local oscillator and means for deriving said signal of frequency $f_2$ from the signal output of said scanning local oscillator.

3. A system for measuring intermodulation distortion generated by a translating device, said translating device having an input circuit and an output circuit, a heterodyne mixer having an input circuit and an output circuit, means coupling the output circuit of said translating device to the input circuit of said mixer, a source of signal of frequency $f_1$ coupled to said input circuit of said translating device, a source of frequency scanning signal of frequency $f_2$ coupled to said input circuit of said translating device, means for selecting intermodulation representative distortion signal of frequency $f_2$ from the output circuit of said mixer to the exclusion of other products of conversion, and means including a frequency scanning spectrum analyzer for visually plotting the amplitude of said intermodulation representative distortion signal of frequency $f_2$ as a function of the frequency $f_2$.

4. The combination according to claim 3 wherein said spectrum analyzer includes a signal spectrum input circuit arranged to accept the frequency $f_2$ over its range of values, and means including a scanning local oscillator for converting said frequency $f_2$ to a fixed value and for deriving said frequency $f_2$ from said scanning local oscillator.

5. A system for measuring intermodulation distortion generated by a translating device, said translating device having an input circuit and an output circuit, comprising a source of first signal of frequency $f_1$ coupled to said input circuit, a source of second frequency scanning signal of frequency $f_2$ coupled to said input circuit, means for deriving from said output circuit a distortion representative signal in response to said first signal and said second signal jointly, said distortion representative signal having an amplitude representative of intermodulation distortion generated by said translating device for each value of said frequency scanning signal of frequency $f_2$, a frequency scanning superheterodyne receiver having an input circuit, means coupling said output circuit to said input circuit of said frequency scanning superheterodyne receiver, said frequency scanning superheterodyne receiver including a frequency scanning local oscillator, and heterodyne means for deriving said frequency scanning signal of frequency $f_2$ from said scanning local oscillator.

6. The combination according to claim 5 wherein said frequency scanning superheterodyne receiver is a scanning spectrum analyzer, said scanning spectrum analyzer including means for visually displaying a plot of amplitude of said distortion representative signal versus frequency of said local oscillator.

7. A system for measuring intermodulation distortion generated by a signal translating device, comprising means for applying a first and a second signal of first and second distinct frequencies to said translating device for translation thereby, means for heterodyning the output of said signal translating device with the first of said two signals, and means for detecting the amplitude of only the intermodulation signal distortion representative signal at the second of said two frequencies present at the output of said means for heterodyning, wherein said second of said two signals is frequency variable over a frequency band, and wherein is provided a frequency scanning spectrum analyzer having a frequency scanning local oscillator, and means for deriving said second of said two signals by heterodyning the frequency of said frequency scanning local oscillator with a fixed frequency.

8. A system for measuring intermodulation distortion generated by a signal translating device, comprising means for applying a first and a second signal of first and second distinct frequencies to said translating device for translation thereby, means for heterodyning the output of said signal translating device with the first of said two signals, and means for detecting the amplitude of only the intermodulation signal distortion representative signal at the second of said two frequencies present at the output of said means for heterodyning, wherein said second of said two signals is frequency variable over a frequency band, and wherein is provided a frequency scanning spectrum analyzer having a spectrum input terminal, said frequency scanning spectrum analyzer including means for scanning the input acceptance frequency of said frequency scanning spectrum analyzer over said frequency band in synchronism with variation of said second of said two signals, and means for applying said second of said two signals to said spectrum input terminal.

9. A visual plotting system for plotting intermodulation distortion generated by a translating device, comprising a spectrum analyzer having a frequency scanning local oscillator, a mixer coupled to said frequency scanning local oscillator, an intermediate frequency amplifier coupled in cascade to said mixer, a cathode ray tube indicator having means for generating a cathode ray beam, means for sweeping said beam in a first coordinate direction as a function of frequency of said frequency scanning local oscillator, means for continuously deflecting said beam in a second coordinate direction as a function of amplitude of signals amplified by said intermediate frequency amplifier during scanning of said local oscillator, means responsive to said frequency scanning local oscillator for generating a first frequency scanning signal, means for applying said first frequency scanning signal to said translating device, means for generating a second signal, means for applying said second signal to said translating device, said translating device generating an intermodulation response to said first and second signal and means for coupling said intermodulation response to said spectrum analyzer for display on said cathode ray tube indicator of a plot of intermodulation response against frequency of said local oscillator.

10. In a system for visually plotting intermodulation distortion generated by a translating device, a visual plotter for generating a plot of amplitude against frequency, said visual plotter including a frequency scanning oscillator, means responsive to said frequency scanning oscillator for generating a pair of diverse frequency signals for application to said translating device, at least one of said diverse frequency signals being a frequency scanning signal synchronized in frequency with the frequency of said oscillator but covering a frequency response band of said translating device, means for applying said diverse frequency signals to said translating device, and means coupled to said translating device and responsive to said frequency scanning local oscillator for generating a visual plot of intermodulation distortion generated by said translating device in response to said diverse frequency signals versus frequency of said frequency scanning signal.

11. A system for plotting the frequency response and the intermodulation response of a translating device as a function of a scanning frequency, comprising a spectrum analyzer including a heterodyne mixer, a signal input terminal for said mixer, a scanning local oscillator coupled to said mixer, an intermediate frequency amplifier coupled in cascade to said mixer, a video detector couplied in cascade to said intermediate frequency amplifier, a visual indicator having means for generating a visual indication and for deflecting said indication in coordinate directions, means for effecting deflection of said indication in one of said directions as a function of said scanning frequency and in the other of said directions in response to output of said video amplifier, means for deriving from said scanning frequency a test scanning frequency covering at least a portion of the response band of said spectrum analyzer, means for applying said test scanning frequency to said translation device as a first input signal, and means for applying the response of said translating device to said signal input terminal, whereby to generate a plot of response versus frequency for said means for translating device, means for applying a second input frequency signal to said translating device to cause generation of intermodulation response thereby, and means for applying said intermodulation response to said spectrum analyzer for plotting of said intermodulation response versus said test scanning frequency.

12. An intermodulation distortion plotter for plotting intermodulation distortion generated by a translating device, comprising a cathode ray tube indicator, said indicator including means for generating a cathode ray beam and first and second means for deflecting said beam in coordinate directions, respectively, a source of a first signal, a source of a second signal, at least said first signal being a frequency scanning signal, means applying said signals to said translating device, said translating generating said intermodulation distortion, means for generating a first deflection signal, means for generating a second deflection signal having an instantaneous amplitude which is a function of the instantaneous frequency of said frequency scanning signal, and means for applying said first and second deflection signals to said first and second means for deflecting, respectively, means for disconnecting only said second signal from said translating device, means responsive to said first signal for generating a third deflection signal representative of response of said translating device to said first signal alone, and means for applying said third deflection signal to said first means for deflecting.

References Cited in the file of this patent

UNITED STATES PATENTS

| | | |
|---|---|---|
| 2,432,214 | Sontheimer | Dec. 9, 1947 |
| 2,530,596 | Blok | Nov. 21, 1950 |
| 2,756,390 | Albersheim | July 24, 1956 |
| 2,929,989 | Hurvitz | Mar. 22, 1960 |
| 2,945,177 | Moren | July 12, 1960 |
| 2,970,258 | Sinclair | Jan. 31, 1961 |
| 2,971,152 | Ranky | Feb. 7, 1961 |

OTHER REFERENCES

"Intermodulation and Harmonic Distortion Measurements," article in Audio Engineering, October 1948, pages 17, 18 and 55.

"A Sonic Analyzer," article in Radio Electronics, October 1948, pages 40–41.